United States Patent
Singhal et al.

(10) Patent No.: US 7,224,979 B2
(45) Date of Patent: May 29, 2007

(54) LOCATION-AWARE SERVICE PROXIES IN A SHORT-RANGE WIRELESS ENVIRONMENT

(75) Inventors: Sandeep K. Singhal, Englewood Cliffs, NJ (US); Richard K. Neves, Tarrytown, NY (US); Darren M. Sanders, Nanuet, NY (US)

(73) Assignee: Symantec Corporation, Cupertino, CA (US)

(*) Notice: Subject to any disclaimer, the term of this patent is extended or adjusted under 35 U.S.C. 154(b) by 481 days.

(21) Appl. No.: 09/848,441

(22) Filed: May 3, 2001

(65) Prior Publication Data

US 2002/0164952 A1 Nov. 7, 2002

(51) Int. Cl.
*H04Q 7/20* (2006.01)
(52) U.S. Cl. .............. 455/456.1; 455/456.3; 455/41.2; 455/414.1; 370/338
(58) Field of Classification Search ............. 455/456.1, 455/456.3, 456.5, 41.2, 41.3, 414.1, 414.2, 455/435.1; 370/338
See application file for complete search history.

(56) References Cited

U.S. PATENT DOCUMENTS

| | | | |
|---|---|---|---|
| 5,737,318 A | 4/1998 | Melnik | |
| 5,751,704 A | 5/1998 | Kostic et al. | |
| 5,752,193 A | 5/1998 | Scholefield et al. | |
| 6,249,252 B1 | 6/2001 | Dupray | |
| 6,351,646 B1 | 2/2002 | Jellema et al. | |
| 6,452,498 B2* | 9/2002 | Stewart | 340/573.1 |
| 6,493,539 B1* | 12/2002 | Falco et al. | 455/67.11 |
| 6,526,275 B1* | 2/2003 | Calvert | 455/418 |
| 6,535,493 B1* | 3/2003 | Lee et al. | 370/329 |
| 6,549,625 B1* | 4/2003 | Rautila et al. | 380/258 |
| 6,606,323 B1* | 8/2003 | Ramamurthy et al. | 370/395.53 |
| 6,650,902 B1* | 11/2003 | Richton | 455/456.3 |
| 2001/0044305 A1 | 11/2001 | Reddy et al. | |
| 2002/0035699 A1 | 3/2002 | Crosbie | |
| 2002/0160806 A1 | 10/2002 | Nitzan et al. | |
| 2003/0004758 A1* | 1/2003 | Luttrell | 705/3 |
| 2003/0139180 A1* | 7/2003 | McIntosh et al. | 455/426 |
| 2003/0224795 A1* | 12/2003 | Wilhoite et al. | 455/445 |

FOREIGN PATENT DOCUMENTS

| | | | |
|---|---|---|---|
| EP | 0483551 | A2 | 5/1992 |
| EP | 0589522 | A1 | 3/1994 |
| EP | 0740440 | A2 | 10/1996 |
| EP | 0 483 551 | B1 | 1/1997 |
| EP | 0 589 522 | B1 | 3/1997 |
| EP | 0 851 633 | A2 | 7/1998 |
| EP | 0851633 | A2 | 7/1998 |

(Continued)

OTHER PUBLICATIONS

Communication Pursuant to Article 96(2) EPC, EP 01 961 957.6, Mar. 23, 2006, 6 pages.

(Continued)

*Primary Examiner*—Matthew Anderson
*Assistant Examiner*—Minh Dao
(74) *Attorney, Agent, or Firm*—Fenwick & West LLP

(57) ABSTRACT

A system and a method for delivering location sensitive services within a short-range wireless environment. Service proxies are employed to customize queried information and make services available according to user identity and location.

36 Claims, 5 Drawing Sheets

FOREIGN PATENT DOCUMENTS

| | | |
|---|---|---|
| EP | 0 917 328 A2 | 5/1999 |
| EP | 0917328 A2 | 5/1999 |
| EP | 0 944 203 A2 | 9/1999 |
| EP | 0944203 A2 | 9/1999 |
| EP | 1 139 632 A2 | 10/2001 |
| EP | 1139632 A2 | 10/2001 |
| EP | 0 740 440 B1 | 10/2005 |
| WO | WO 00/69186 | 11/2000 |
| WO | WO 00/69186 A1 | 11/2000 |
| WO | WO 01/06734 A2 | 1/2001 |
| WO | WO 0106734 A2 | 1/2001 |
| WO | WO 01/28185 A2 | 4/2001 |
| WO | WO 0128185 A1 | 4/2001 |
| WO | WO 01/58177 A2 | 8/2001 |

OTHER PUBLICATIONS

Aziz, A. et al, "Privacy and Authentication for Wireless Local Area Networks: A Secure Communications Protocol to Prevent Unauthorized Access", IEEE Personal Communications, IEEE Communications Society. US. vol. 1, No. 1, 1994. pp. 25-31, XP000460718, ISSN: 1070-9916.

Bharghavan, V., "Secure Wireless LANs", 2nd ACM Conference on Computer and Communications Security, Nov. 2, 1994, pp. 10-17, XP002155490.

GlobeCom '93., IEEE Houston, TX, USA, Nov. 29-Dec. 2, 1993, New York, NY, USA, IEEE, Nov. 29, 1993, pp. 550-554, XP010109722, ISBN: 0-7803-09 17-0.

Haartsen, J., "Bluetooth: Vision, Goals, and Architecture", Mobile Computing and Communications Review, ACM, New York, NY, US, vol. 2, No. 4, Oct. 1, 1998, pp. 38-45, XP000784002.

Hung-Yu, Lin et al., "Authentication in Wireless Communications", Global Telecommunication Conference, 1993, including a Communications Theory Mini-Conference. Technical Prograr Conference Record, IEEE in Houston, TX, USA.

Jue, J. P., et al., "Design and analysis of replicated servers to support IP-host mobility in enterprise networks", Communications, 1997. ICC '97 Montreal, Que., Canada Jun. 8-12, 1997, New York, NY, USA, IEEE, US, Jun. 8, 1997, pp. 1256-1260, XP010226957 ISBN: 0-7803-3925-8.

Srisuresh P., et al., IP Network Address Translator (NAT) Terminology and Considerations, XP-002204216, Request for Comments 2663, published by The Internet Society, Aug. 1999.

"3Com Introduces Industry's First Layer 3 Wireless LAN Security Solution", published at http://www.3com.com/news/releases/pr00/jul0500a.html, Jul. 5, 2000, Santa Clara, CA.

Snoeren, A. et al., "An End-to-End Approach to Host Mobility," 6th ACM/IEEE International Conference on Mobile Computing and Networking (Mobicom '00), Aug. 2000, Boston, MA.

Aziz, A. et al., "Privacy and Authentication for Wireless Local Area Networks," IEEE Personal Communications, First Quarter 1994, pp. 25-31.

Bharghavan, V., "Secure Wireless LANs," ACM, 1994, pp. 10-17.

European Search Report, EP 01966271.7, 4 pages, Jun. 9, 2005.

Haartsen, J. et al., "Bluetooth: Vision, Goals, and Architecture, Mobile Computing and Communications Review," pp. 38-45, vol. 2, No. 4, 1998.

Jue, J.P. et al., "Design and Analysis of Replicated Servers to Support IP-Host Mobility in Enterprise Networks," IEEE, 1997, pp. 1256-1260.

Lin, H.Y. et al., "Authentication in Wireless Communications," IEEE, 1993, pp. 550-554.

Notification of Transmittal of the International Search Report, PCT/US01/24821, Aug. 30, 2002, 7 pages.

Notification of Transmittal of the International Search Report, PCT/US01/26659, Feb. 18, 2002, 6 pages.

Notification of Transmittal of the international Search Report, PCT/US01/26520, Jan. 24, 2003, 9 pages.

Notification of Transmittal of the International Preliminary Examination Report, PCT/US01/26659, Oct. 23, 2002, 8 pages.

Prasad, A. et al, "Security Architecture for Wireless LANs: Corporate & Public Environment," VTC 2000-Spring, 2000 IEEE 51st. Vehicular Technology Conference Proceedings. Tokyo, Japan, May 15-18, 2000.

Srisuresh, P. et al., "IP Network Address Translator (NAT) Terminology and Considerations," Network Working Group, Aug. 1999, pp. 1-30.

* cited by examiner

LOCATION-AWARE SERVICE PROXIES IN A SHORT-RANGE WIRELESS ENVIRONMENT

CROSS REFERENCE TO RELATED APPLICATIONS

This application is co-pending with and claims pursuant to 35 U.S.C. §120 as to its common subject matter the filing date of patent application Ser. No. 09/637,742, filed Aug. 11, 2000 (now U.S. Pat. No. 6,633,761), and patent application Ser. No. 09/657,745, filed Sep. 8, 2000 (now U.S. Pat. No. 6,691,227).

BACKGROUND OF THE INVENTION

1. Field of the Invention

The invention relates generally to wireless networks, and more particularly to the delivery of location-based services in an intra-building environment through the use of short-range wireless technology.

2. Description of the Prior Art

Short-range wireless technologies such as 802.11, Bluetooth, HomeRF, and others are being rapidly deployed to allow mobile devices to connect with existing intra-building wired Local Area Networks (LANs). To enable this connectivity, wireless access points are being developed by various manufacturers. An example of such an access point is the Aironet 340 access point (an 802.11 type access point) manufactured by Cisco Systems, Inc. of San Jose, Calif. Another example is the AXIS 9010 access point (a Bluetooth type access point) manufactured by Axis Corporation of Lund, Sweden. Short-range wireless access points deliver connectivity over a small radius, i.e., a radius that is typically 100 meters or less.

At the same time, a wide variety of location-based services have been developed over wide-area cellular networks. These services include: (1) emergency location services (commonly referred to as "E-911" services); (2) consumer information services, such as locating the nearest restaurant, gas station or parking spot; and (3) mapping services for determining the optimal route to a particular destination. These location-based services are implemented by determining the user's location through queries to a cellular base station or Home Location Register (HLR) at the cellular service provider. Alternatively, implementation is achieved via triangulation of critically located points obtained through multiple base stations. The resolution of such location determinations is typically on the order of a few hundred meters.

Cellular service coverage is often limited in intra-building environments, making existing location-based services, and indeed wide-area services, generally inaccessible. Moreover, the granularity of location information, which is hundreds of meters, is too coarse to be useful for intra-building location-based services. There are myriad types of intra-building location-based services. By way of example, these services may include: (1) locating the nearest computer printer or the nearest projector; (2) locating the nearest person meeting a particular characteristic, such as the nearest cardiologist in a hospital environment; and (3) locating the nearest restroom. For such intra-building requests, users require location-based services having the capability of providing answers within a granularity on the order of tens of meters. Clearly, existing wide-area location-based services are insufficient for this task.

Therefore, what is needed is a system and method for delivering location-based services in an intra-building environment. The method must provide reliable coverage within the building and must deliver service with a fine level of granularity.

SUMMARY OF THE INVENTION

It is an object of the present invention is to provide a system and method for delivering location-based services in an intra-building environment using short-range wireless technology.

It is another object of the present invention to deliver intra-building location-based services having a fine level of granularity, at least on the order of tens of meters.

It is a further object of the present invention to provide a system and method for delivering such intra-building services, wherein the services are enabled through the deployment of "location-aware service proxies" that intercept requests initiated by mobile clients and, subsequently, deliver location sensitive information to the user.

A network system is provided comprising: at least one mobile client; one or more short-range wireless access points; software operating directly on these access points or, alternatively, on one or more adapters coupled to these access points; a location registry; and a plurality of location-aware service proxies.

The software on each access point, or coupled adapter as the case may be, monitors the traffic generated by the wireless clients on the associated access point. Using the software, the location registry receives notifications relating to client presence. A plurality of location-aware service proxies are provided for intercepting a client's request and, subsequently, generating corresponding responses incorporating location sensitive information for the requesting client.

BRIEF DESCRIPTION OF DRAWINGS

The preferred embodiments of the invention will hereinafter be described in conjunction with the appended drawings provided to illustrate and not to limit the invention, where like designations denote like elements, and in which.

DETAILED DESCRIPTION OF PREFERRED EMBODIMENTS

Figure 1:
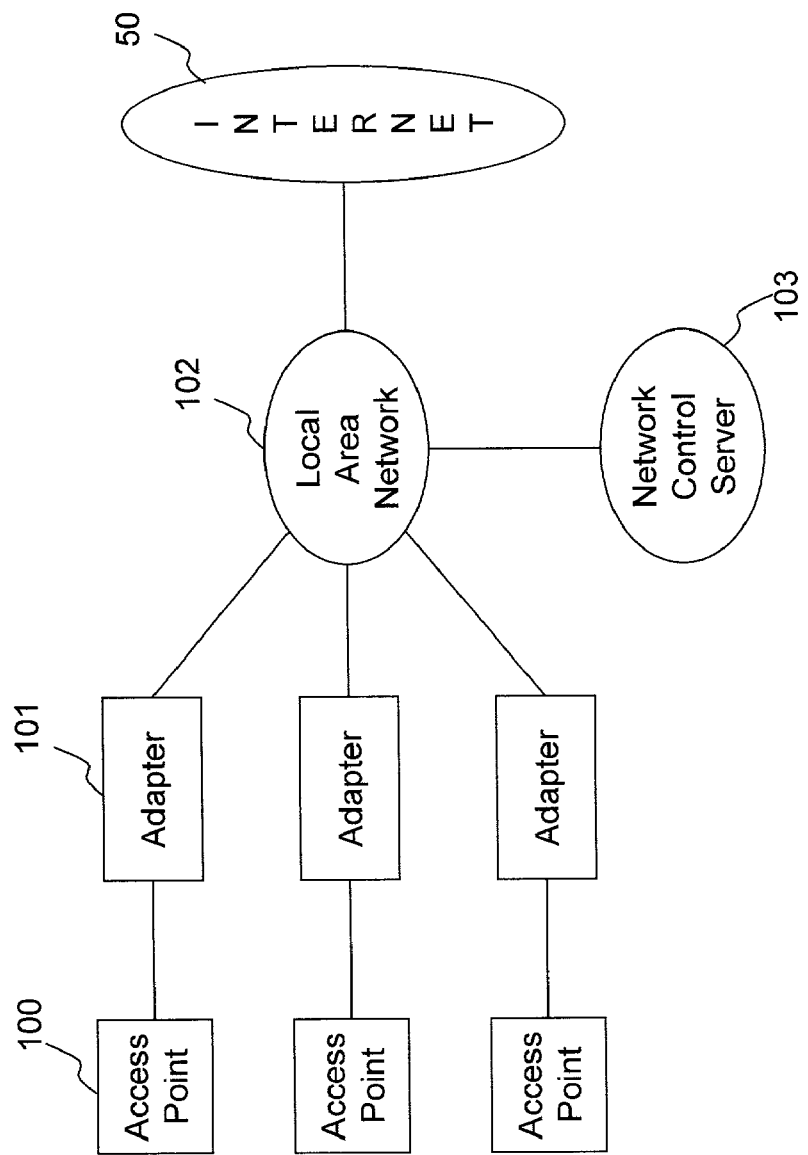
FIG. 1 is a block diagram illustrating a network having access points, a location Registry and a location-aware service proxy in accordance with the present invention.

Referring now to FIG. 1, a plurality of mobile clients 100 equipped with short-range wireless communication devices (not shown) reside within one or more Local Area Networks (LANs) 106. Each LAN includes a plurality of short-range wireless access points 101, each capable of communicating with the communication device carried by mobile clients 100. Software is incorporated into the access points 101 or, alternatively, into an adapter 104 coupled to the access points 101. As used herein, the term "adapter" is generally defined as any device which provides an interface between separate networks. The software communicates information to a location registry 102 which functions to track the location of each active client 100. The location registry 102 also maintains a table 105 listing the current access point(s) associated with each client Medium Access Control (MAC) address. A plurality of location-aware service proxies 103 communicate with the location registry 102.

In a preferred embodiment of the present invention, the software located on each access point 101, or on each adapter 104, as the case may be, monitors the traffic generated by the wireless clients 100 thereon. When a new client device is detected on an access point 101, a register notification is communicated to the location registry 102. The notification includes a unique identifier (ID) associated with the access point 101, and a unique identifier (ID) associated with the client device. Preferably, the unique ID associated with both the access point 101 and the client device comprises the corresponding MAC address.

Upon making a determination that a previously recognized client device is no longer present at a particular access point 101, a reverse registration notification is communicated to the location registry 102. As used herein, the terms "reverse registration" and "registration reversal" are intended to generally describe the removal or deletion of a previous registration. The reverse registration notification contains a unique identifier (ID) associated with the access point 101 and the client device; again, the unique ID preferably comprises the respective MAC addresses.

Alternatively, the above-described notifications can be transmitted via less reliable communications means. However, in that where such alternate communication means are utilized, packets are retransmitted if no acknowledgement is received within a predefined suitable timeout period. Methods for achieving such reliability where unreliable communication means are employed are well known in the art. In this case, the register notification preferably includes a timestamp or sequence number, enabling the location registry 102 to detect, and subsequently discard, duplicate packets.

A variety of different methods are known in the art for determining a client device arrival at, or departure from, an access point. In the preferred embodiment of the present invention, the access points 101, or adapters 104 coupled to the access points, maintain an Active Client List containing the MAC addresses associated with active clients. When network traffic is received from a mobile client whose MAC address is not on the Active Client List, the client is assumed to be present, and the corresponding MAC address is added to the Active Client List. If traffic has not been received within a predefined timeout period, from a mobile client whose MAC address is on the Active Client List, the client is assumed to have departed. In that case, the corresponding MAC address is deleted from the Active Client List. Whenever a new device is detected, a register notification is communicated to the location registry 102. When a device is no longer detected, a reverse registration notification is communicated to the location registry 102.

In an alternate embodiment of the present invention, the software on an access point 101 or adapter 104 periodically transmits a register notification identifying all clients that are currently visible to that particular access point. In this alternate embodiment of the invention, the register notification contains the contents of the Active Client List. Furthermore, the location registry 102 automatically removes registrations of clients having identities provided in a register notification but not included in a subsequent register notification.

Preferably, the location registry 102 is located at a central location or host. Alternatively, however, the location registry can be co-located with an access point 101, an adapter 104, or a service proxy 103.

In a further aspect of the invention, the location registry 102 can be stored over a cluster of processors or in a distributed manner so as to efficiently utilize storage, processing power, network bandwidth or other resources. One benefit of such a distributed implementation is that it achieves improved fault tolerance during the occurrence of network or system failures.

In another aspect of the invention, the functionality of access point 101 or adapter 104 is enhanced to include additional relevant information, pertaining to the mobile client 100, within each registration message to the location registry 102. The location registry 102 can then provide this information as part of its response to a location query. For example, the registration message might include information pertaining to the type of mobile client, its user, or its network characteristics.

Figure 2:
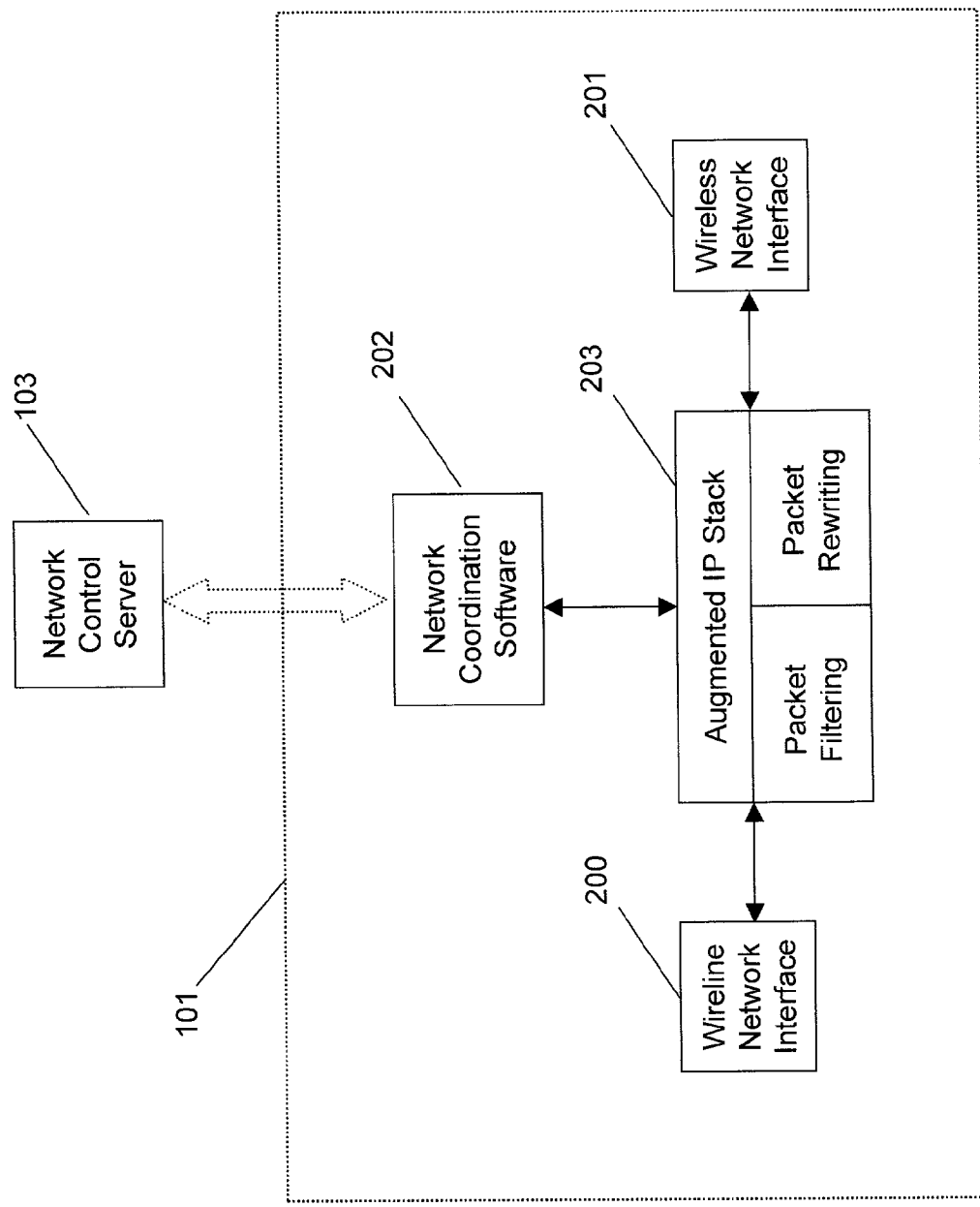
FIG. 2 is a flow chart illustrating a method of using the system of FIG. 1, in accordance with a preferred embodiment of the present invention.

Referring now primarily to FIG. 2 in conjunction with FIG. 1, an exemplary method for generating and processing registration and reverse registration messages is provided.

Initially, as shown generally at step 200, a local access point 101 detects the arrival of a mobile client 100 to the network. Subsequently, as shown generally at step 201, the local access point 101 transmits a register notification to the location registry 102. The location registry 102 maintains a table 105 listing the access point(s) currently associated with each client ID. As shown generally at step 202, upon receiving the register notification, the location registry adds the corresponding access point ID to the list of locations at table 105 for the associated client ID, unless the access point is determined to be currently registered. As shown generally at steps 203–205, when a mobile client moves beyond the detectable range of a local access point, the local access point detects 203 the departure of the mobile client, transmits 204 a reverse registration notification to the location registry 102 and, upon receiving the reverse registration notification, the location registry removes 205 the corresponding access point ID from the list of locations for the associated client ID.

The present invention can include one or more location-aware service proxies 103. Each service proxy 103 is responsible for receiving client requests of a particular type and subsequently generating one or more responses incorporating location-sensitive information for the requesting client. The location registry 102 exposes a query protocol through which location aware service proxies 103 can query for the location(s) associated with a particular client ID.

Figure 3:
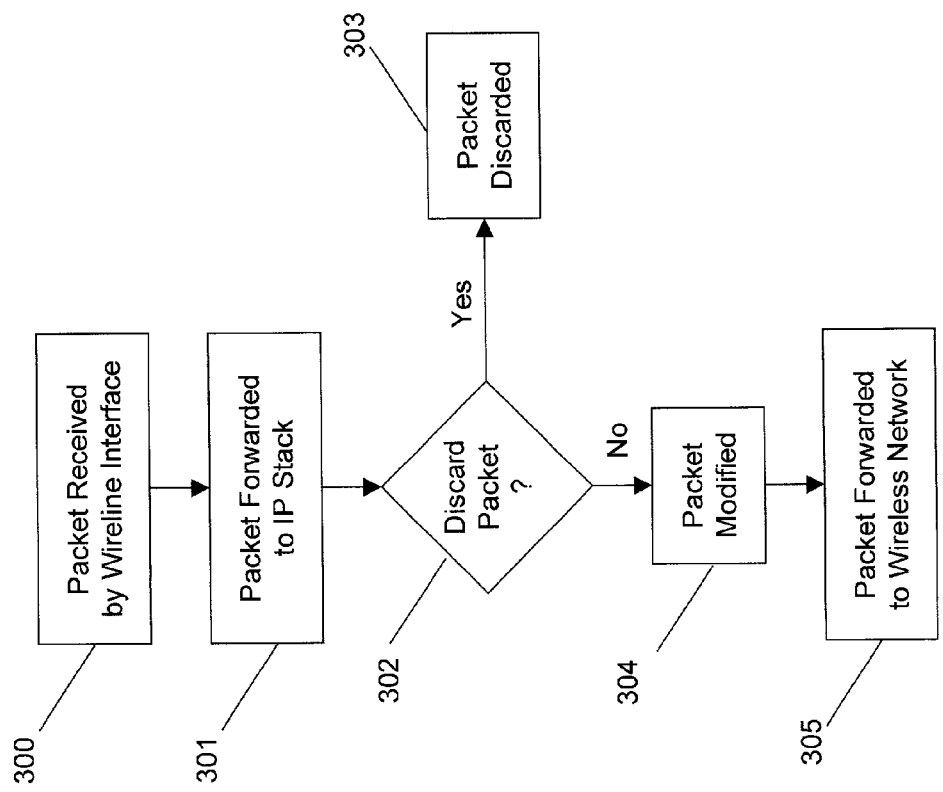
FIG. 3 is a flow chart illustrating a typical query process with a mobile client, in accordance with the present invention.

Referring now primarily to FIG. 3, a preferred method for request processing by a location aware service proxy 103 is described.

Initially, as shown generally at step 300, the location-aware service proxy 103 issues a request for information from the Location Registry 102, including the client ID for which the information is being requested. Subsequently, as shown generally at step 301, upon receiving the information request, the location registry 102 accesses the table 105 entry associated with the client ID contained in the query request, and retrieves the list of access point IDs associated with the client ID. Finally, as shown generally at step 302, the location registry issues a response to the location aware service proxy, including the list of access point IDs retrieved from table 105.

Figure 4:
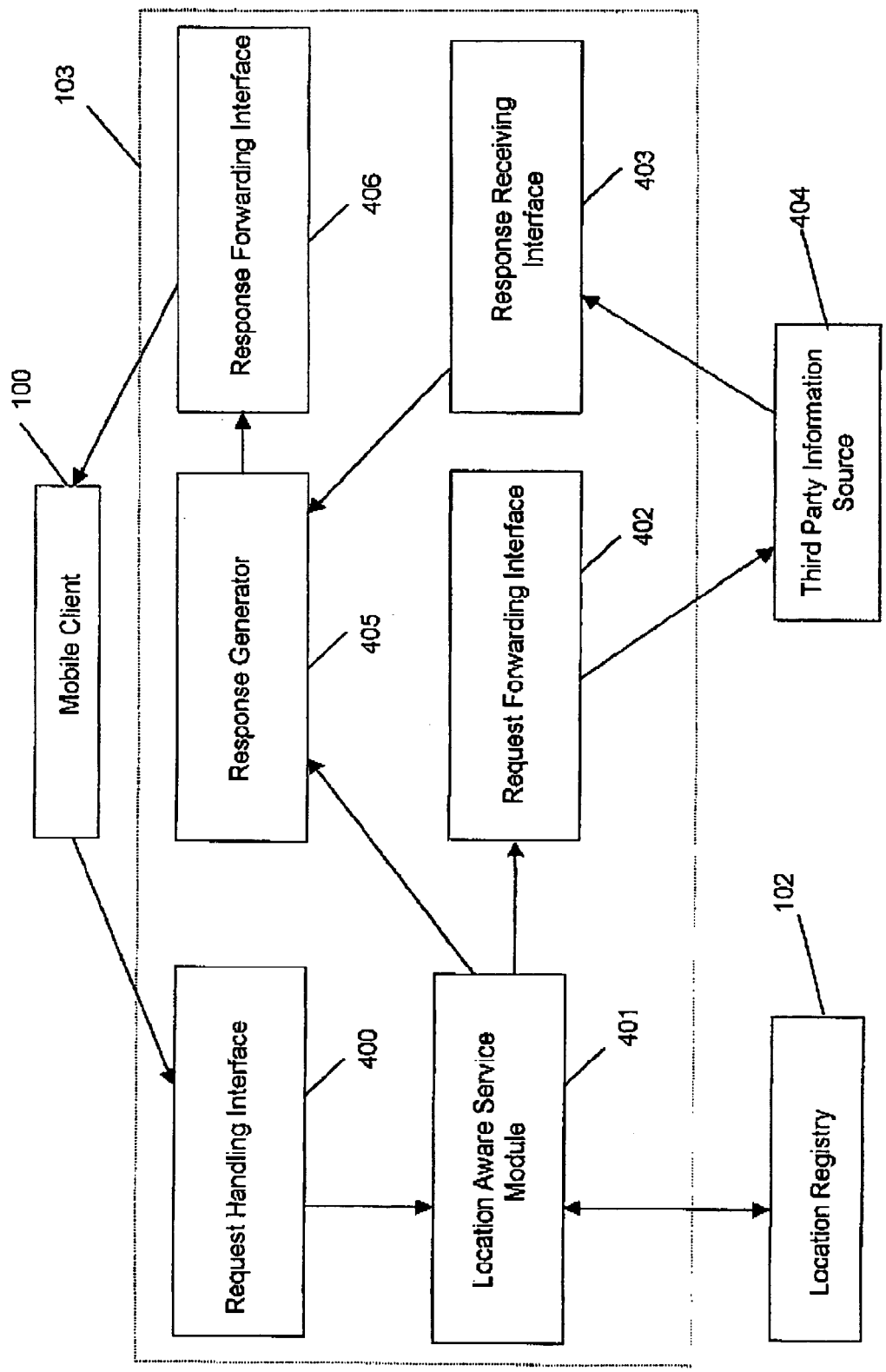
FIG. 4 is a block diagram of a location-aware service proxy in accordance with the present invention.

In an alternative embodiment of the invention, the location registry 102 may be programmed with additional information about the location of access points, including the geographic coordinates or building and room number associated therewith. When available, this information can be returned as part of the response sent to the Location Aware Service Proxy in step 302. Referring now primarily to FIG. 4, the various components of the location aware service proxy 103 will be described in more detail. A request-handling interface 400 is provided for intercepting and interpreting requests from the mobile client 100. A location-aware service module 401 is provided for determining appropriate service information based upon a user location obtained through a query request 300 to the location registry 102. An optional request-forwarding interface 402 can be provided for forwarding client requests to a third-party information source 404. An optional response-receiving interface 403 can be provided for receiving responses from third-party information source 404. A response generator 405 is provided for fashioning a client response based upon the appropriate location-based service information and the optional service response from third-party information source 404. A response-forwarding interface 406 is provided for forwarding the generated response to the mobile client 100.

Figure 5:
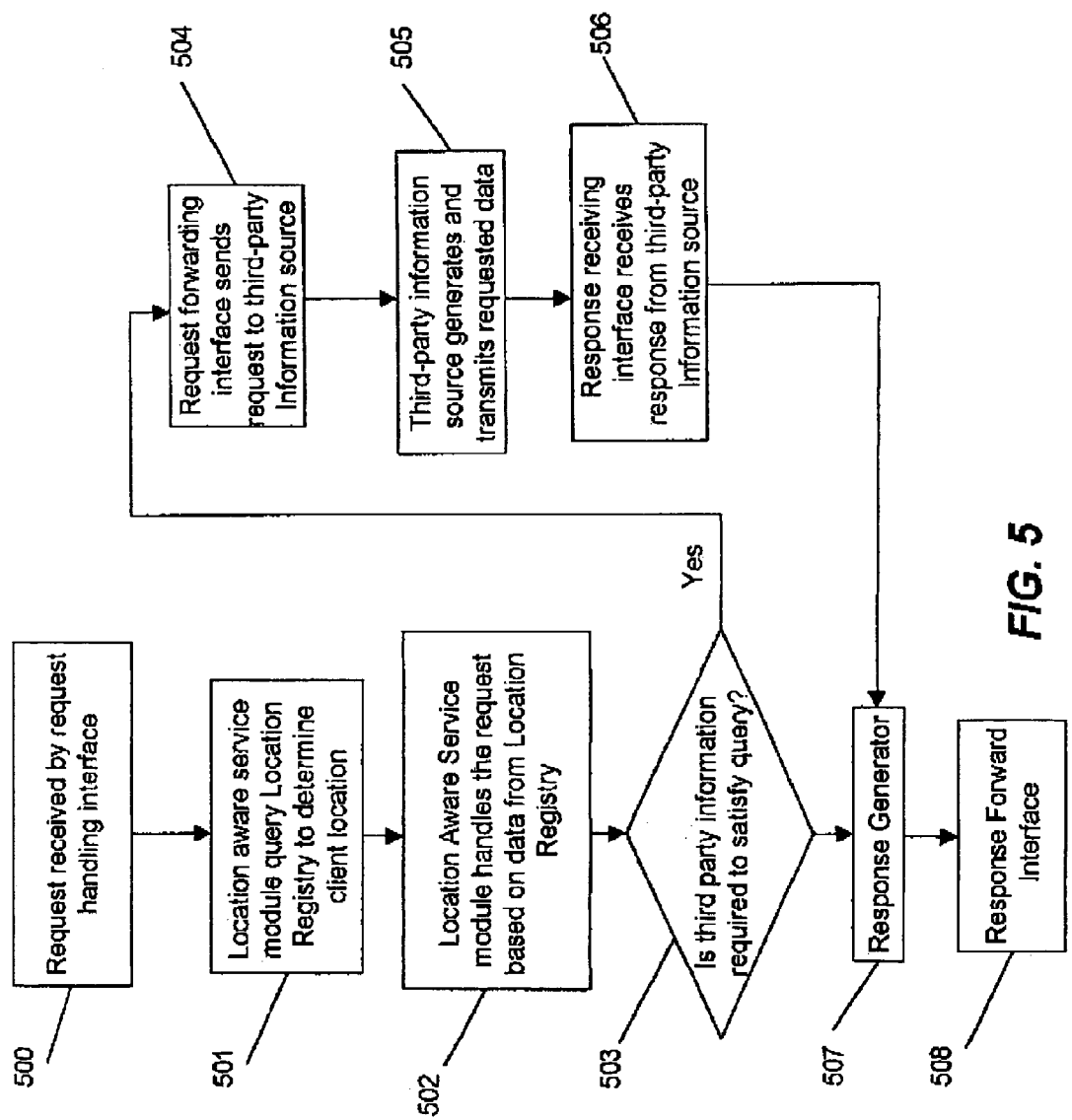
FIG. 5 is a flow chart illustrating a method of handling a request in accordance with the location-aware service proxy of the present invention.

Referring now primarily to FIG. 5, the preferred location aware service proxy method will now be described in more detail. Initially, a mobile client request is received by the request handling interface, as shown generally at step 500. Subsequently, the location-aware service module determines the client location by issuing a query to the location registry, as shown generally at step 501. Subsequently, as shown generally at step 502, the location-aware service module determines the best means for handling the request, based upon the information contained in the request and the location information obtained from the location registry. Subsequently, as shown generally at step 503, the module determines whether or not satisfying the client query requires interfacing with a third-party information source. If third-party information is required, a request is issued 504 to the third party information source from the request forwarding interface, the third-party information source generates and transmits 505 the requested information, the response-receiving interface receives 506 a response from the third-party information source, and the response generator creates 507 a corresponding response for, and transmits 508 the response to, the client. If third-party information is not required as determined at step 503, only steps 507 and 508 are performed.

As will be apparent to those skilled in the art, steps 504–506 can be repeated when information from multiple third-party information sources has to be obtained by the location aware service proxy.

In an alternative embodiment of the method of FIG. 5, the decision logic of blocks 503–506 can occur prior to block 501. For example, information can be initially obtained from a third-party information source, then, according to the received information, location information can be retrieved to customize a client response.

This present invention can be used in conjunction with a Protocol Proxy and Data Manipulation Server (DMS), such as that described in commonly assigned U.S. Pat. No. Ser. No. 09/848,394, filed concurrently herewith and incorporated herein by reference, entitled "Technique for Enabling Remote Data Access and Manipulation from a Pervasive Device." As disclosed therein, a Protocol Proxy intercepts mobile client requests and, using service information obtained from the Data Manipulation Server, annotates the returned content with available services based on a plurality of criteria, possibly including location. These Protocol Proxies may be used in conjunction with the present invention by annotating the content returned from a Location Aware Service Proxy with these additional services. The Protocol Proxy may employ the query interface of the Location Registry defined herein to obtain location information about the mobile client. Moreover, a Location Aware Service Proxy, as disclosed herein, may also function as a Protocol Proxy. In this latter case, the Location Aware Service Proxy preferably performs further location-sensitive filtering on the available service list obtained from the DMS. Alternatively, the Location Aware Service Proxy may transmit location information (obtained from the Location Registry) to the DMS, where the DMS then factors that information into its service list-generation processing.

In the preferred embodiment, the following Location Aware Service Proxies 103 are provided:

(1) A Hypertext Transfer Protocol (HTTP) proxy which receives a plurality of HTTP requests transmitted by the clients and generates location-based content. For instance, the content can be based on information obtained from an external server identified in the HTTP request. By way of example, the HTTP proxy might receive a request for a location-based map. Upon receiving the request, the proxy obtains the location of mobile client 100. Based upon the client location, the proxy 103 generates (or otherwise obtains) a map, which is then forwarded back to the requesting client. Alternatively, the HTTP proxy can determine what, if any, additional services are available to the client in that location, e.g., available equipment such as a printer or projector. Preferably, this information is obtained by querying an optional resource location registry (such as a Data Manipulation Server as described in the above-identified commonly-assigned patent application Ser. No. 09/848,394), which can be co-located with the location registry 102 of the present invention. Links to these services can be added to the response document, for subsequent transmission back to the requesting client.

(2) A Wireless Session Protocol (WSP) proxy which receives WSP requests transmitted by the clients and generates location-based content, e.g., based on information obtained from an external server identified in the WSP request. The Wireless Session Protocol (WSP) is defined as part of the Wireless Application Protocol (WAP). More information about WSP can be found at http://www.wapforum.org. By way of example, the WSP proxy could receive a request for a location-based map. Upon receiving the request, the proxy obtains the location of mobile client 100. Based on this location, the proxy 103 generates (or otherwise obtains) a map which is then forwarded back to the requesting client. Alternatively, this proxy could determine the availability of additional client services at the location. Preferably, this information is obtained by querying an optional resource location registry (such as a Data Manipulation Server as described in the above-identified commonly-assigned patent application Ser. No. 09/848,394), which can be co-located with the location registry 102 of the present invention. Links to these services can be added to the response document, for subsequent transmission back to the requesting client.

(3) A Domain Name System proxy which receives a plurality of DNS requests transmitted by the clients. The DNS proxy determines whether the requested hostname corresponds to a location-based service and, if so, determines the appropriate IP address according to the client's location. The client's location is obtained from the location registry 102, while the IP address is obtained from a resource location registry. If the requested hostname does not correspond to a location-based service, the DNS proxy forwards the request to the default DNS server. By way of example, when the user requests the IP address for a host named "printer," the DNS proxy determines the client's current location and returns the IP address of the nearest printer. However, when the user requests the IP address for a host named "www.reefedge.com," the DNS proxy forwards the request to the default DNS server to determine the address of www.reefedge.com. The DNS proxy can also be used to support locally-available services, such as "login" or "search" services.

(4) A message proxy which receives a query for current messages from the mobile clients. The message proxy obtains a list of current messages by issuing a query to a message server. The mobile client's 100 location is obtained from the location registry 102, and the list of current messages is filtered according to the client location. In this manner, delivery of a particular message can be delayed until a client has reached a particular location, or until a client has exited from a particular location.

(5) A directory proxy which receives a query for directory information from the mobile clients. The directory proxy obtains information about the requested user. The user's location is then obtained from the location registry 102, and the information is included in the response provided to the mobile client. In this manner, directory queries are automatically augmented with information about the location of the queried user. In the preferred embodiment, the directory proxy supports the LDAP (Lightweight Directory Access Protocol) protocol. The LDAP protocol is described in RFC 1777 available at http://www.rfceditor.org. The directory proxy can also be implemented as an HTTP proxy that responds to requests received via the HTTP protocol. Alternative embodiments can employ other protocols for receiving directory queries.

By practicing the system and methods of the present invention, a client host is completely shielded from the necessity to explicitly query for location-based services in an intra-building environment.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A system for delivering location-based services to mobile clients in a building structure using short-range wireless technology, comprising:
   a plurality of short range wireless access points adapted to communicate with mobile clients;
   a location registry for tracking a location of each mobile client; and
   one or more location-aware service proxies adapted to receive from a mobile client a request for a location-based service and to deliver a response thereto, the response comprising location-based information provided in view of the requesting client's location as tracked in the location registry;
   wherein at least one of the location-aware service proxies is configured to:
      receive a DNS request specifying a host name from a mobile client,
      determine if the requested host name corresponds to a location-based service, and
      responsive to a determination that the requested host name corresponds to a location-based service, return an IP address of a host of the requested host name located within the same building structure as the mobile client based on the client's location.

2. A system as recited in claim 1, further comprising a module for providing communication between the location registry and each of the access points.

3. A system as recited in claim 1, further comprising at least one active client list maintained by a wireless access point and containing Medium Access Control (MAC) address for a client that is visible to the wireless access point.

4. A system as recited in claim 1, wherein the wireless access points are adapted to detect an identity of a system user.

5. A system as recited in claim 1, wherein the wireless access points are adapted to detect one or more mobile client characteristics.

6. A system as recited in claim 1, wherein the location registry is configured to:
   receive notification information from the wireless access points; and
   maintain a list of wireless access points associated with each of the mobile clients, responsive to received notification information.

7. A system as recited in claim 1, wherein the one or more location-aware service proxies comprises at least one of: an HTTP proxy, a WSP proxy, a DNS proxy, a message proxy and a directory proxy.

8. A system as recited in claim 7 wherein the message proxy includes means for filtering a list of current messages requested from a message server based upon a requesting client's location.

9. A system as recited in claim 1, further comprising a protocol proxy, the protocol proxy annotating content received from a particular service proxy.

10. A system as recited in claim 9, wherein the location registry further comprises a query interface with which the protocol proxy can obtain location information about a mobile client.

11. A system as recited in claim 9, wherein the protocol proxy annotates the content with available services.

12. A system as recited in claim 11, wherein the available services result from a location-based filtering of an available services list.

13. A system as recited in claim 1, further comprising at least one active client list, wherein the at least one active client list is maintained by an adapter coupled to a wireless access point and containing a Medium Access Control (MAC) address for a client that is visible to the wireless access point.

14. A system as recited in claim 1 wherein each location-aware service proxy is adapted to intercept requests of a particular type.

15. A system as recited in claim 14, wherein each location-aware service proxy is further adapted to determine, from the location registry, the location of a particular client from which a particular request is intercepted.

16. A system as recited in claim 15, wherein the determined location comprises a list of each of the access points with which the particular client is currently associated.

17. A system as recited in claim 15, wherein the determined location comprises geographic coordinates of each of the access points with which the particular client is currently associated.

18. A system as recited in claim 15, wherein the determined location comprises a building and room number of each of the access points with which the particular client is currently associated.

19. A system as recited in claim 1, wherein each location-aware service proxy is further adapted for contacting a third-party information source to obtain information for generating the location-based information.

20. A method for delivering location-based services to a plurality of mobile clients within a building structure using short-range wireless technology, the method comprising the steps of:
   receiving a plurality of requests for services from mobile clients; and
   providing location-aware services to the mobile clients from a plurality of location-aware service proxies, responsive to the plurality of requests;
   wherein at least one of the location-aware service proxies is adapted to perform the steps of:
      receiving a DNS request specifying a host name from a mobile client,
      determining that the requested host name corresponds to a location-based service, and
      determining an IP address of a host of the requested host name located within the same building structure as the mobile client based on the client's location and in response to the determination that the requested host name corresponds to a location-based service.

21. The method of claim 20, further comprising the steps of:
   establishing a plurality of short-range wireless access points adapted to communicate with the mobile clients; and
   providing a notification to a location registry upon detecting a mobile client on an access point.

22. A method as recited in claim 21, further comprising the step of transmitting a reverse registration notification from the wireless access point to the location registry upon detecting a mobile client departure from the wireless access point.

23. A method as recited in claim 21, further comprising the step of transmitting register notifications from a wireless access point to the location registry at timed intervals, wherein the register notifications include a list of all mobile clients actively communicating with the wireless access point, and the location registry defines a mobile client address as unregistered when the client is not included on the active mobile client list.

24. A method as recited in claim 21, further comprising the step of maintaining an active client list associated with each access point, each active client list including MAC addresses corresponding to clients on the active client list.

25. A method as recited in claim 24, further comprising the step of adding a MAC address of a mobile client upon detection of network traffic from the mobile client.

26. A method as recited in claim 24, further comprising the step of deleting a MAC address of a mobile client upon failure to detect client traffic therewith within a predetermined time period.

27. A method as recited in claim 21, further comprising the step of transmitting notification information from the wireless access points to the location registry, the location registry maintaining a list of current access points associated with each of the mobile clients.

28. A method as recited in claim 21, further comprising the step of enhancing the functionality of an access point to identify a system user or a mobile client characteristic.

29. A method as recited in claim 21, further comprising the step of adding an access point ID to the location registry for a particular client ID upon receiving a registry notification.

30. A method as recited in claim 21, further comprising the step of removing an access point ID from the location registry for a particular client ID upon receiving a reverse registry notification.

31. A method as recited in claim 20, further comprising the steps of:
   monitoring requests made by the mobile clients; and
   determining the quantity of time lapsed between requests of the mobile clients.

32. A method as recited in claim 31, further comprising the step of defining a mobile client departure from a wireless access point based upon said a determined time lapse.

33. A method as recited in claim 20, further comprising the step of generating responses incorporating location-based information via the location-aware service proxies.

34. A method as recited in claim 20 wherein the location-aware service proxy further comprises a message proxy, and wherein the method further comprises the step of filtering a list of current messages received from a message server, based upon a client location via the message proxy.

35. A method as recited in claim 20, wherein the location-aware service proxy further comprises a protocol proxy adapted to annotate messages received from the location-aware service proxy.

36. A method as recited in claim 35, wherein at least one of the available services annotations further comprises a link to one of the available services.

* * * * *

UNITED STATES PATENT AND TRADEMARK OFFICE
CERTIFICATE OF CORRECTION

| | | |
|---|---|---|
| PATENT NO. | : 7,224,979 B2 | Page 1 of 1 |
| APPLICATION NO. | : 09/848441 | |
| DATED | : May 29, 2007 | |
| INVENTOR(S) | : Sandeep K. Singhal et al. | |

It is certified that error appears in the above-identified patent and that said Letters Patent is hereby corrected as shown below:

At claim 32, column 10, line 35, please remove "said" before "a".

Signed and Sealed this

Fourteenth Day of August, 2007

JON W. DUDAS
*Director of the United States Patent and Trademark Office*